US008495607B2

(12) United States Patent
Gschwind (10) Patent No.: US 8,495,607 B2
(45) Date of Patent: Jul. 23, 2013

(54) PERFORMING AGGRESSIVE CODE OPTIMIZATION WITH AN ABILITY TO ROLLBACK CHANGES MADE BY THE AGGRESSIVE OPTIMIZATIONS

(75) Inventor: Michael K. Gschwind, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 714 days.

(21) Appl. No.: 12/714,877

(22) Filed: Mar. 1, 2010

(65) Prior Publication Data

US 2011/0214016 A1    Sep. 1, 2011

(51) Int. Cl.
*G06F 9/44* (2006.01)
*G06F 9/45* (2006.01)

(52) U.S. Cl.
USPC ............ 717/160; 717/152; 717/140; 717/110

(58) Field of Classification Search
USPC ................................................. 117/140–161
See application file for complete search history.

(56) References Cited

U.S. PATENT DOCUMENTS

| 5,490,216 | A  | * | 2/1996 | Richardson, III ............... 705/59 |
| 5,930,510 | A  | * | 7/1999 | Beylin et al. .................. 717/161 |
| 7,114,164 | B2 | * | 9/2006 | Smith et al. .................... 719/318 |
| 7,380,276 | B2 | * | 5/2008 | Saha et al. ....................... 726/22 |
| 2001/0014967 | A1 | * | 8/2001 | Santhanam ........................ 717/9 |
| 2002/0019941 | A1 |   | 2/2002 | Chan et al. |
| 2003/0115579 | A1 | * | 6/2003 | Archambault et al. ........ 717/152 |
| 2004/0044880 | A1 |   | 3/2004 | Altman et al. |
| 2004/0243836 | A1 |   | 12/2004 | England et al. |
| 2005/0091494 | A1 |   | 4/2005 | Hyser |
| 2007/0038975 | A1 |   | 2/2007 | Lennon et al. |
| 2007/0169030 | A1 | * | 7/2007 | Tarditi et al. .................. 717/140 |
| 2007/0226722 | A1 | * | 9/2007 | Chou .............................. 717/158 |
| 2008/0126764 | A1 | * | 5/2008 | Wu et al. ......................... 712/226 |
| 2009/0064117 | A1 | * | 3/2009 | Bashkansky et al. ......... 717/154 |
| 2009/0235254 | A1 |   | 9/2009 | Michael |
| 2009/0307656 | A1 | * | 12/2009 | Eichenberger et al. ....... 717/110 |

FOREIGN PATENT DOCUMENTS

WO    WO 99/10795    3/1999

OTHER PUBLICATIONS

International Search Report and Written Opinion dated May 12, 2011 for International Application No. PCT/US11/26161, 10 pages.
Bobba, Jayaram et al., "Performance Pathologies in Hardware Transactional Memory", ACM, ISCA '07, Jun. 9-13, 2007, 11 pages.
Eichenberger, Alexandre E. et al., "Dynamic Data Driven Alignment and Data Formatting in a Floating-Point SIMD Architecture", U.S. Appl. No. 12/250,584, filed Oct. 14, 2008.

(Continued)

*Primary Examiner* — Don Wong
*Assistant Examiner* — Mohammad Kabir
(74) *Attorney, Agent, or Firm* — Francis Lammes; Stephen J. Walder, Jr.; William J. Stock (57) ABSTRACT

Mechanisms for aggressively optimizing computer code are provided. With these mechanisms, a compiler determines an optimization to apply to a portion of source code and determines if the optimization as applied to the portion of source code will result in unsafe optimized code that introduces a new source of exceptions being generated by the optimized code. In response to a determination that the optimization is an unsafe optimization, the compiler generates an aggressively compiled code version, in which the unsafe optimization is applied, and a conservatively compiled code version in which the unsafe optimization is not applied. The compiler stores both versions and provides them for execution. Mechanisms are provided for switching between these versions during execution in the event of a failure of the aggressively compiled code version. Moreover, predictive mechanisms are provided for predicting whether such a failure is likely.

25 Claims, 7 Drawing Sheets

OTHER PUBLICATIONS

Eichenberger, Alexandre E. et al., "Dynamically Aligning Enhanced Precision Vectors Based on Addresses Corresponding to Reduced Precision Vectors", U.S. Appl. No. 12/250,599, filed Oct. 14, 2008.

Eichenberger, Alexandre E. et al., "In-Data Path Tracking of Floating Point Exceptions and Store-Based Exception Indication", U.S. Appl. No. 12/543,614, filed Aug. 19, 2009.

Gschwind, Michael K., "Floating Point Only Single Instruction Multiple Data Instruction Set Architecture", U.S. Appl. No. 12/250,575, filed Oct. 14, 2008.

Gschwind, Michael K., "Generating and Executing Programs for a Floating Point Single Instruction Multiple Data Instruction Set Architecture", U.S. Appl. No. 12/250,581, filed Oct. 14, 2008.

Herlihy, Maurice et al., "Transactional Memory: Architectural Support for Lock-Free Data Structures", Proceedings of the 20th Annual International Symposium on Computer Architecture, May 1993, pp. 289-300.

"Method for enabling a simple design with high performance and precise expections in a transaction-based system", IBM Corporation, Technical Disclosure, IP.com Prior Art Database, Jun. 9, 2009, 3 pages.

Notification Concerning Transmittal of International Preliminary Report on Patentability and International Preliminary Report on Patentability dated Sep. 13, 2012 for International Application No. PCT/US2011/026161, 6 pages.

* cited by examiner

```
short *x;
short a0, a1, a2;
register vector short partial_vector_a;

a0 = vec_extract(partial_vector_a, 0);
a1 = vec_extract(partial_vector_a, 1);
a2 = vec_extract(partial_vector_a, 2);

```
short *x;
short a0, a1, a2;
register vector short partial_vector_a;
register vector short mem;

mem=*x;
mem = merge_3e(mem, partial_vector_a);
*x = mem
```

```
...
vector float v_a, v_b, v_c;
v_a = *(vector float*)a;
v_b = *(vector float*)b;
v_c = *(vector float*)c;

v_a = vec_fma(v_a, v_b, v_c);
*(vector float*)a – v_a;
...
```

*FIG. 8B*

```
...
vector float v_a, v_b, v_c;

transaction_begin;
v_a = *(vector float*)a;
v_b = *(vector float*)b;
v_c = *(vector float*)c;

v_a = vec_fma(v_a, v_b, v_c);
*(vector float*)a – v_a;
transaction_end;
...
```

*FIG. 8C*

PERFORMING AGGRESSIVE CODE OPTIMIZATION WITH AN ABILITY TO ROLLBACK CHANGES MADE BY THE AGGRESSIVE OPTIMIZATIONS

This invention was made with United States Government support under Contract No. B554331 awarded by the Department of Energy. The Government has certain rights in this invention.

BACKGROUND

The present application relates generally to an improved data processing apparatus and method and more specifically to mechanisms for performing aggressive code optimizations with an ability to rollback changes made by the aggressive optimizations.

Typically, for a program to be executed on a computing system, the source code for the program is compiled and linked to generate executable code. As part of the compilation process, a compiler typically performs one or more optimizations on the source code to enable more efficient execution of the program. While the compiler may identify many opportunities to transform the source code so as to optimize its execution, the compiler is typically constrained in the optimizations it can perform or where such optimizations may be applied by the semantics of the source code being compiled.

For example, boundary scenario behavior, which rarely or never actually occurs, limits optimization of code because of the very possibility of the boundary condition existing. That is, because a particular source code statement, when transformed by a particular compiler optimization, may result in a boundary condition occurring, even though it may rarely if ever actually occur during execution, the compiler cannot apply the optimization that might otherwise be able to be applied if this possible boundary condition were not present. Such boundary conditions include, for example, transforming source code into optimized code that spans a memory page boundary and that page is not accessible, i.e. the memory page is either set to be inaccessible either for reading, writing, or both, or the page has been "paged out" meaning stored on an external storage medium and removed from main memory and the page table. For example, one compiler optimization that may be affected by such boundary scenario behavior is the transformation of scalar source code to compiled vector code. The compiler seeks to preserve the behavior of the original source code after such transformations. However, in transforming scalar code to vector code, it is possible that the original scalar code would not have any boundary condition violations when performed using sequential scalar code execution, but when transformed to vector code, which is executed in a parallel manner, may result in a boundary condition violation that may result in incorrect execution of the transformed code with regard to transformed code preserving the original behavior of the source code. Moreover, when transforming code to be executed in a multithreaded environment, the transformed code may introduce a thread level race condition in which two or more threads access the same portion of data in a parallel manner and thus, the writing of the data by one thread may introduce errors into the operation of the other thread or threads.

As a result, when a compiler determines that a boundary condition violation may occur in the transformed code, the compiler typically does not perform the optimization on that portion of code in order to avoid any possibility, no matter how remote, that the transformed code might operate in a different manner from the original source code. Thus, the compiled code is not optimized as much as possible since optimizations are not applied in areas where there is a possibility of a boundary condition violation or other behavior that is not consistent with the original source code.

Alternatively, a user may manually override this compiler behavior and instruct the compiler to ignore these semantics. As a result, the compiler may still make the transformations, but this may result in an erroneous operation of the transformed code. Moreover, users often do not known whether particular semantics in the source code or transformed code are essential and are hesitant to override the compiler's normal behavior.

SUMMARY

In one illustrative embodiment, a method, in a data processing system, for aggressively optimizing computer code is provided. The method comprises determining, by a compiler executing on a processor in the data processing system, an optimization to apply to a portion of source code. The method further comprises determining, by the compiler, if the optimization as applied to the portion of source code will result in unsafe optimized code and is thus, an unsafe optimization. The unsafe optimized code is code that introduces a new source of exceptions being generated by the optimized code, or generates results which are different from the results that would have been obtained by the original code. Moreover, the method comprises, in response to a determination that the optimization is an unsafe optimization, generating, by the compiler, an aggressively compiled code version of the portion of source code, in which the unsafe optimization is applied, and a conservatively compiled code version in which the unsafe optimization is not applied. Furthermore, the method comprises storing, by the compiler, both the aggressively compiled code version and conservatively compiled code version in a storage device associated with the data processing system.

In another illustrative embodiment, a method, in a data processing system, for executing a portion of code is provided. The method comprises receiving executable code having a portion of code for which an aggressively compiled code version and a conservatively compiled code version are provided in the executable code. A processor of the data processing system executes the aggressively compiled code version and determines if an exception condition occur during execution of the aggressively compiled code version. The method further comprises rolling-back changes to a state of the portion of code in response to a determination that an exception condition occurs. Moreover, the method comprises executing the conservatively compiled code version in the processor of the data processing system in response to rolling-back changes to the state of the portion of code.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiments.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiments.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for enabling aggressive compiler optimizations in a system that supports rollback of changes made by aggressively compiled code, e.g., a system that utilizes transactional memory structures or other types of atomic operations. In some illustrative embodiments, the mechanisms of the illustrative embodiments leverage the atomic behavior of the system, e.g., the atomic behavior of a transaction based system, to determine whether an aggressive compiler optimization will result in an erroneous operation of the transformed and optimized code, e.g., a boundary condition violation, thread level race conditions, etc., and if so, rollback the changes made by the execution of the aggressively optimized code in favor of a less optimized or non-optimized version of the code. While a transaction based system will be used as the basis for the description of the following illustrative embodiments, it should be appreciated that the present invention is not limited to such and any system that permits the rollback of changes made by an aggressively compiled version of code, e.g., a system that supports atomic operations, may be used to implement the mechanisms of the illustrative embodiments without departing from the spirit and scope of the present invention.

Many systems utilize atomic operations. An atomic operation is a set of two or more operations that can be combined so that they appear to the data processing system in which they are performed to be a single operation with only two possible outcomes: success or failure. With an atomic operation, operations in other sets of operations do not know about any changes being made by the operations within the set of operations that comprise the atomic operation until the entire set of operations completes. Moreover, with an atomic operation, if any of the operations within the set of operations fails, the entire set of operations fails and the state of the system is restored to the state it was in before any of the operations within the set of operations began executing.

An atomic commit operation is an operation in which a set of distinct changes is applied as a single operation. If all the changes are applied, the atomic commit is said to have succeeded. If there is a failure before the atomic commit can be completed, the "commit" is aborted and all changes that have taken place are reversed or rolled back. In either case, the atomic commit leaves the system in a consistent state. Atomic commits are often used in database systems when committing multiple sets of changes at once. Atomic commits are employed by revision control systems whereby atomic commits are used to control uploading of changes of multiple files to a source of the files while guaranteeing that all files get fully uploaded and merged. Atomic commits are also employed by numerous transactional processing systems (ATMs, online purchasing, etc.) in which operations on different systems (e.g., order placement, credit card transaction, inventory update) are combined in a single set that succeeds or fails as a group.

Atomic commits are also useful in the areas of transactional memory and speculative multi-threading, also known as thread-level speculation. Transactional memory attempts to simplify concurrent or parallel programming by allowing a group of load and store instructions to execute in an atomic manner, i.e. it is guaranteed that either (1) all instructions of the transaction complete successfully or (2) no effects of the instructions of the transactions occur. With atomic transactions, the instructions of the transaction appear to occur all at once between invocation and results being generated.

Hardware transactional memory systems may have modifications to the processors, caches, and bus protocols to support transactions or transaction blocks, i.e. groups of instructions that are to be executed atomically as one unit. Software transactional memory provides transactional memory semantics in a software runtime library. Software transactional memory can be combined with hardware support to design a hybrid transactional memory system.

The concept of transactional memory was introduced by Herlihy and Moss "Transactional Memory: Architectural Support for Lock-Free Data Structures," Proceedings of the 20th Annual International Symposium on Computer Architecture, pp. 289-300, May 1993. However, as described in Bobba et al., "Performance Pathologies in Hardware Transactional Memory," ISCA '07, Jun. 9-13, 2007, a programmer can invoke a transaction in a multi-threaded application and rely on the transactional memory system to make its execution appear atomic in a global serial order. Bobba et al. discusses conflict resolution policies in transactional memory systems.

Transactional memory systems seek high performance by speculatively executing transactions concurrently and only committing transactions that are non-conflicting. A conflict occurs when two or more concurrent transactions access the same data element, e.g. a word, block, object, etc., and at least one access is a write. Transactional memory systems may resolve some conflicts by stalling one or more transactions.

Speculative multi-threading is a type of speculative execution that occurs at a thread level as opposed to an instruction level. Speculative multi-threading is a dynamic parallelization technique that uses out-of-order execution of instructions of multiple threads to achieve an increase is operational speed of processors. With speculative multi-threading, the changes performed by threads may be committed atomically if there are no dependency violations between threads. Dedicated hardware keeps track of speculative thread read (load) and write (store) data locations and aborts, i.e. rolls back or squashes, threads that are shown to have violated an actual data dependency, e.g., threads involved in a race condition.

With the mechanisms of the illustrative embodiments, a compiler generates two compiled versions of the same portion of source code. A first compiled version of the portion of source code is referred to as aggressively compiled code because the compiler performs all appropriate transformations and optimizations of the original source code regardless of whether boundary scenario behavior violations, underflow conditions (e.g., divide by 0), overflow conditions (e.g., divide by infinity), thread level race conditions, etc. might occur with the transformed code. In the broadest sense, the aggressively compiled code is code where all appropriate transformations and optimizations that are not always valid are performed, and then rollback may be used to recover. This may even be applied to as yet unknown optimization techniques. Essentially, the normal operation of the compiler with regard to aborting or not applying transformations when the compiler detects that a violation may occur are overridden to generate this first compiled version of the portion of source code.

A second compiled version of the portion of source code is referred to as the conservatively compiled code because the compiler does not perform optimizations that may result in a violation or deviation from the intended operation of the source code, e.g., optimizations that may result in transformed code that may generate a boundary condition violation, thread level race condition, or the like, are not performed. The conservatively compiled code is less optimized than the aggressively compiled code since the conservatively compiled code will typically not have all of the appropriate available optimizations applied when compared to the aggressively compiled code. Examples of aggressively compiled code and conservatively compiled code are provided in FIGS. 8A and 8B, described hereafter.

During execution of the compiled code, the execution will attempt to execute the aggressively compiled code within the scope of a transaction and monitors for an exception condition, e.g., a boundary condition violation, thread level race condition, or the like. In the event of such an exception condition, control is transferred to a transaction manager. The transaction manager comprises logic, which may be implemented in hardware, software, or any combination of hardware and software, to roll back the state of execution of the code to a state prior to the execution of the aggressively compiled code portion that generated the exception condition. The transaction manager then attempts to re-execute the portion of code using the conservatively compiled code. In this way, an automated mechanism is provided for allowing aggressively optimized code to execute in the majority of situations with the conservatively optimized code being executed only in the event that the aggressively optimized code fails, i.e. generates an exception condition.

In a further illustrative embodiment, since rollback and re-execution operations are expensive with regard to the overhead of processor cycles to perform such operation, a prediction mechanism is provided for determining whether a rollback is likely to occur. This determination may be made based on a history based prediction scheme, results of an analysis of the code, or the like. In response to a prediction that a rollback is likely, rather than attempting to execute the aggressively compiled code, the mechanisms of the illustrative embodiments may instead execute the conservatively compiled code to avoid the likely rollback and re-execution operations.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
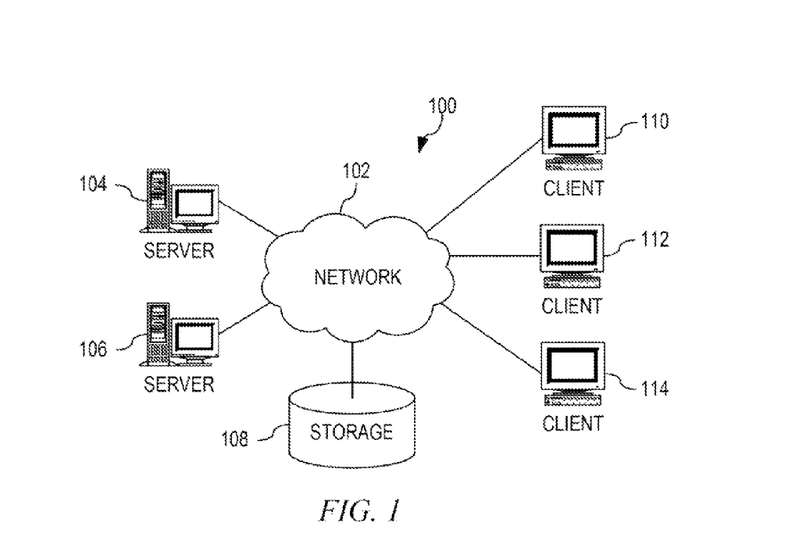
FIG. 1 is an example block diagram of a data processing system in which example mechanisms of the illustrative embodiments may be implemented.
Figure 2:
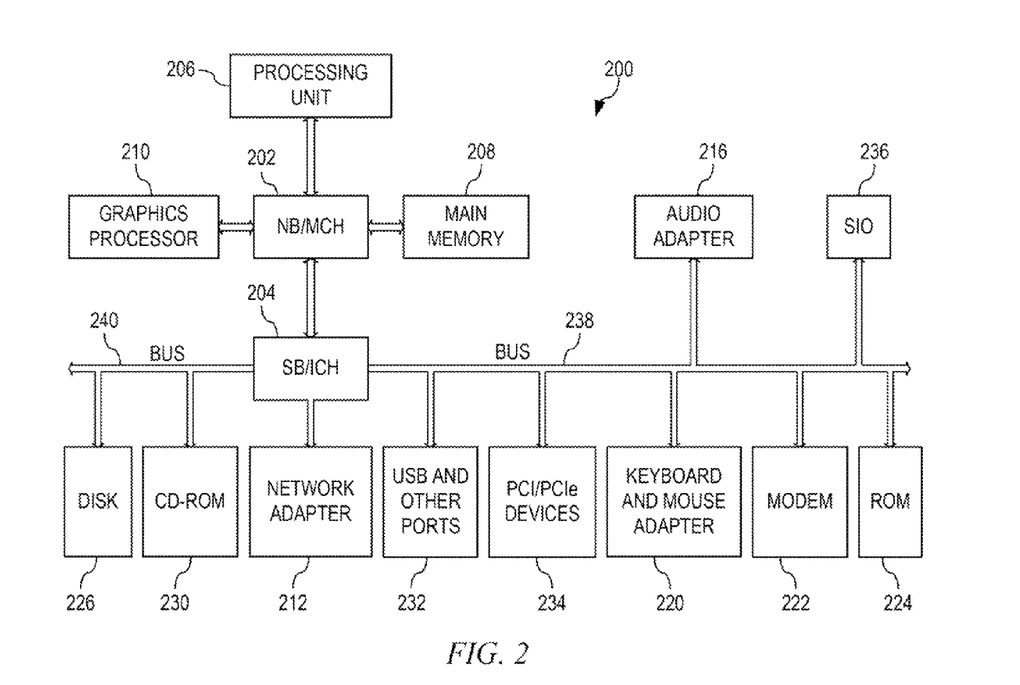
FIG. 2 is an example block diagram of a processor of a data processing system in which aspects of the illustrative embodiments may be implemented.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

The data processing system 200, in one illustrative embodiment, implements a transactional memory system. In one illustrative embodiment, this transactional memory system may be a HASTM system as discussed above. As is generally known in the art, a transactional memory system is one in which transactions that do not overlap are allowed to run uninterrupted in parallel but for purposes of data consistency, portions of the program have to execute atomically, i.e. atomic transactions, whereby transactional memory systems allow programs to read and modify memory locations as a single atomic operation. With transactional memory systems, a transaction is a finite sequence of steps or program instructions executed by a single thread. A transaction may execute serially such that the steps or instructions of one transaction do not interleave with the steps or instructions of another. Transactional memory systems provide a mechanism for guaranteeing the atomicity of atomic portions, or atomic transactions, by guaranteeing that these memory accesses appear to an external observer to take effect all at once, i.e. where an atomic section or transaction either commits or aborts. For more information regarding transactional memory systems, reference is made to commonly assigned and co-pending U.S. patent application Ser. No. 12/046,764, now publication 2009/0235254, which is hereby incorporated by reference.

The illustrative embodiments make use of this transactional memory system to execute the aggressively compiled code as a transaction that can be easily rolled-back with subsequent re-execution of the conservatively compiled code as a separate transaction. The compiler that generates these two compiled versions of a portion of source code may be executed on the same data processing device/system as the one that executes the compiled and linked code or may be on a separate data processing device/system. A transaction monitor also runs on the same or a different data processing device/system and monitors the execution of the compiled and linked code to determine if the aggressively compiled code fails or generates an exception condition due to the aggressive optimizations used to generate the aggressively compiled code. If the aggressively compiled code does fail or generates an exception condition, the transaction monitor may then roll back the transaction and initiate re-execution of the portion of code using the conservatively compiled version of the portion of code.

Figure 3A:
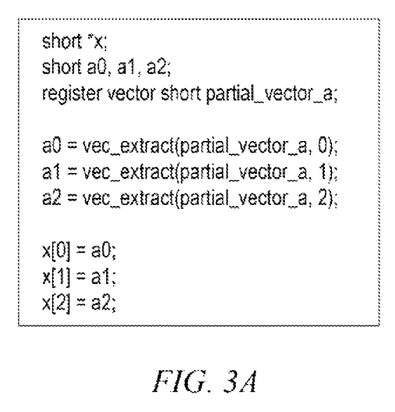
FIG. 3A illustrates an original source code sequence for a portion of code.
Figure 3B:
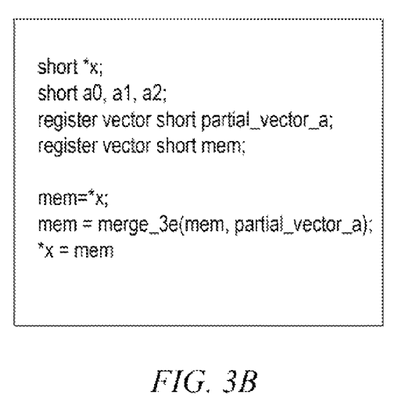
FIG. 3B illustrates the same code sequence after compiler optimization to vectorize the portion of code so that it may be executed more efficiently by a vector processor.

In order to better understand the problem addressed by the illustrative embodiments, an example of code optimization is shown in FIGS. 3A and 3B. FIG. 3A illustrates an original source code sequence for a portion of code. The code in FIG.

3A is an example of single instruction multiple data (SIMD) code that is typically executed in a sequential, non-parallelized manner. FIG. 3B illustrates the same code sequence after aggressive compiler optimization to vectorize the portion of code so that it may be executed more efficiently by a vector processor. Specifically, the vectorized code may be executed in parallel using vector elements. An explanation of one possible mechanism for transforming SIMD code into vectorized code is described in commonly assigned and co-pending U.S. patent application Ser. No. 12/250,575, which is incorporated herein by reference.

Figure 3C:
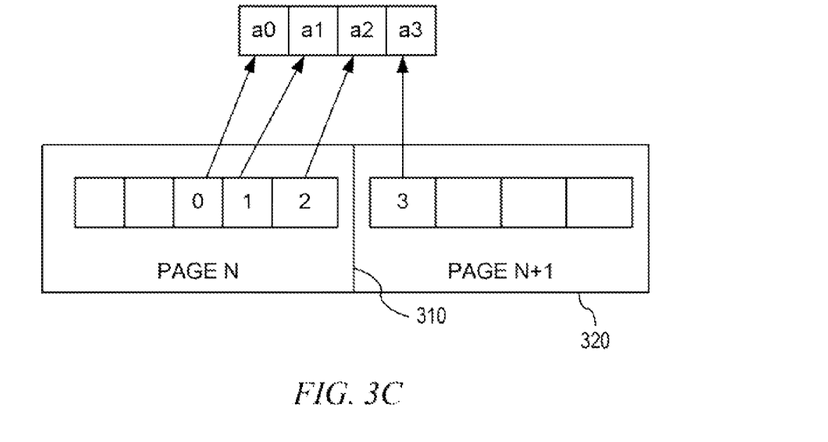
FIG. 3C is an example block diagram illustrating a boundary condition violation generated by the vectorization of code illustrated in FIGS. 3A and 3B.

As shown in FIG. 3A, the original code sequence accesses the first 3 values of the array A and stores them into the first three array registers X. This is done sequentially and thus, there is no concern with regard to any boundary conditions being violated. FIG. 3B illustrates a vectorized form of this code that may be generated through a compiler optimization. If this code is vectorized in this manner, with the vector code using vectors having four elements, arrays are read in blocks of four elements. As a result, as shown in FIG. 3C, even though only 3 array values are utilized by the code, 4 values are loaded due to the vectorization, i.e. even though only a0, a1, and a2 store correct data for purposes of the portion of code, the vectorization causes a3 to also be loaded. If a3 spans a memory page boundary 310 into a memory page 320 which is not accessible to the program, or if a3 is on a page that does not exist and a vector load touches this memory page that is not allocated to the process, this is indicative of a programming error and causes the operating system to indicate an access violation condition which typically terminates the application. A program error may also occur in multithreaded code when a3 is a memory location utilized by another process, in which case the loading of a3 may cause a corruption of data if the a3 value is written back, potentially overwriting write-updates to a3 in an erroneous fashion that were not present in the original code.

Using the above example, the original code shown in FIG. 3A does not result in a boundary condition violation and thus, will not generate an exception. However, the vectorized version of the portion of code can result in a boundary condition violation and may thus, generate an exception condition should the code attempt to access vector elements across memory page boundaries. This exception condition is not present in the original code but is introduced by the optimization performed by the compiler. Thus, in known mechanisms, the compiler will typically determine that this optimization should not be performed on this portion of code.

With the illustrative embodiments, however, the compiler generates both aggressively compiled code in which optimizations that may result in exception conditions being generated due to the optimization, such as may occur from boundary condition violations or the like, for example, and conservatively compiled code for the same portion of source code. In other words, optimizations that the compiler may otherwise not apply to a portion of code are actually applied to the portion of code to generate the aggressively compiled code regardless of whether the compiler determines that such optimizations may result in an exception condition being generated under certain conditions when the optimized and aggressively compiled code is executed. These optimizations are not performed when generating the conservatively compiled code. Thus, for each portion of source code that the compiler determines that an optimization may generate compiled code that has the potential to violate the intended operation of the original source code and generate an exception condition, the compiler generates both an aggressively compiled version of the code and a conservatively compiled version of the code.

When executed on a data processing device/system that uses a transaction memory system, the aggressively compiled code is executed as a single transaction. For example, using the aggressively compiled code shown in FIG. 3B, statements may be introduced into the code to designate the start and end of the transaction with all instructions appearing between the start and end of the transaction being performed as a single transaction. As an example, the code in FIG. 3B may be transformed to execute as a transaction by introducing the following statements (in bold face):

```
short ...
...
register vector short mem;
transaction_begin;
    mem = * x;
    mem = ....
    *x = mem;
transaction_end;
]
```

Thus, within the transaction (between the "trasaction_begin" and "trasaction_end" statements), all of the instructions in the aggressively compiled code either complete successfully or none of the changes made by these instructions is allowed to commit. The execution of the transaction is monitored by a transaction monitor that is present in the data processing device/system, or another data processing device/system that is monitoring the first data processing device/system. In the event that the transaction fails due to one or more of the instructions in the transaction generating an exception, such as in response to a boundary condition violation, thread level race condition, or the like, the transaction monitor identifies this failure and initiates a rollback of the changes made by the transaction's instructions. The transaction monitor then initiates re-execution of the portion of code by invoking the conservatively compiled code for that particular portion of code. Similarly, the use of transactions can prevent the occurrence of race conditions due to interference between threads introduced by such potentially unsafe optimizations, due to the atomicity provided to read-modify-write updates which may be the cause of such race conditions, such as those of FIG. 3B.

In order to be able to invoke the conservatively compiled code in response to a failure of the aggressively compiled code, the transaction monitor is provided with a data structure for mapping or correlating the aggressively compiled code version with the conservatively compiled code version for a portion of source code. The transaction monitor may perform a lookup operation in this data structure in response to a failure of the aggressively compiled code to obtain a pointer to the conservatively compiled code version so that execution can be redirected tot his conservatively compiled code version.

The transaction monitor may further log any failures of aggressively compiled code. For example, the log may contain an identifier of the aggressively compiled code portion and a corresponding count of the number of times that aggressively compiled code portion has failed during execution of the computer program. This log may be used in the same or subsequent execution of the computer program to perform a predictive operation by the transaction monitor. That is, prior to executing the aggressively compiled code version of a portion of code, the transaction monitor may perform a predictive operation for predicting whether or not the aggressively compiled code is likely to result in a failure. This prediction may be performed based on this log which stores the history of previous executions of the aggressively compiled code. If the history indicates that a failure is likely, e.g., the number of failures in the log data structure is greater than a predetermined number, then the transaction monitor may instead initiate the execution of the conservatively compiled code instead of the aggressively compiled code to avoid the overhead of rollback and re-execution operations. Otherwise, the transaction monitor gives preference to the aggressively compiled code which is executed first unless there is a prediction that it will result in failure. With this preference, the conservatively compiled code is only executed in response to a failure of the aggressively compiled code or a prediction that the aggressively compiled code is likely to fail.

Figure 4:
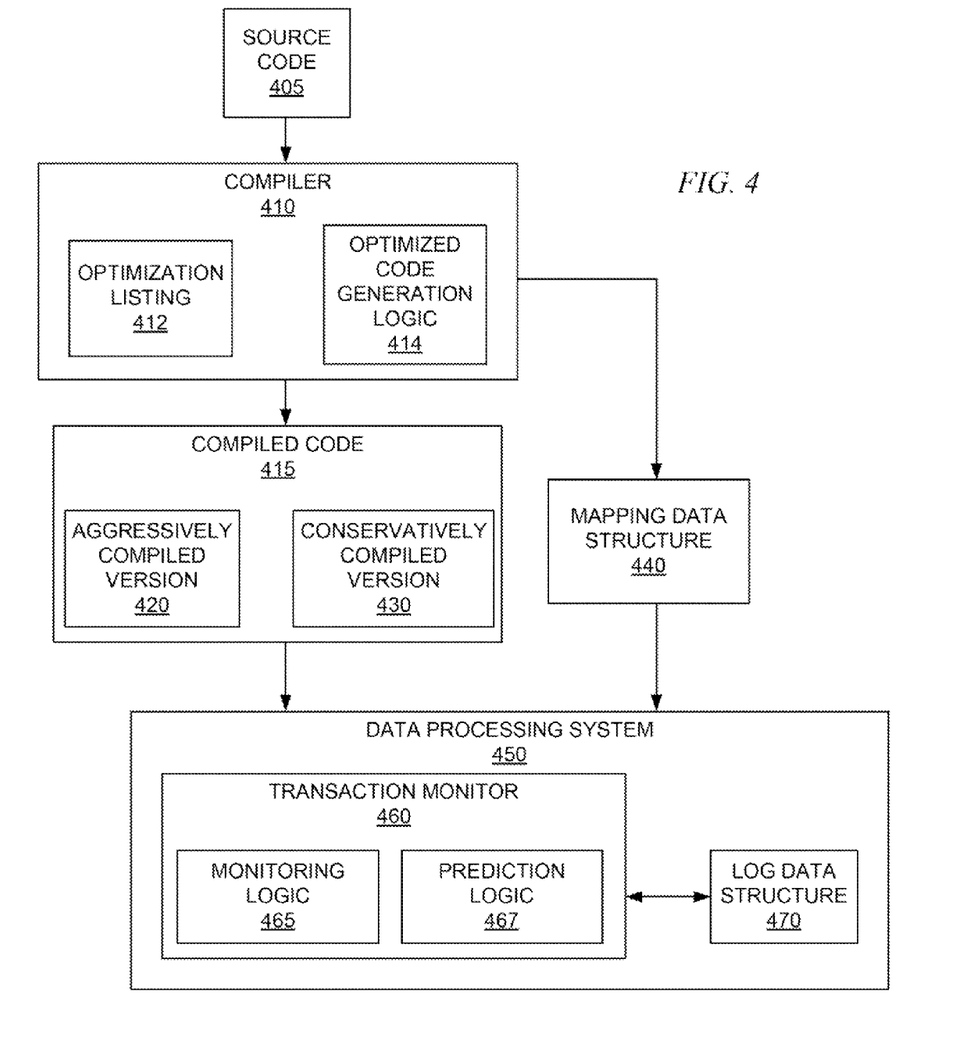
FIG. 4 is an example block diagram of the primary operational elements in accordance with one illustrative embodiment.

FIG. 4 is an example block diagram of the primary operational elements in accordance with one illustrative embodiment. As shown in FIG. 4, a compiler 410 is provided that has optimized code generation logic 414 for implementing the mechanisms of the illustrative embodiments with regard to generating versions of code for portions of source code. The compiler 410 generates compiled code 415 in sections having sizes that are able to be executed as transactions. While compiling the source code 405 into these compiled code sections, the compiler 410 determines whether the optimizations being applied to the source code may result in a deviation of the operation of the code from that intended in by the source code, e.g., a boundary condition behavior may be changed. That is, the compiler 410 determines if the aggressive optimization of the source code will lead to altered semantics. In order to make such a determination, the compiler 410 may be provided with a listing of optimizations 412 that are likely to change the behavior of the code from that of the original source code. Such a listing 412 may be user generated, for example, based on prior observation. The listing 412 may further include indications of the attributes of a portion of code which, when the optimization is applied to the portion of code having these attributes, is likely to cause a change in the semantics.

If the compiler 410 determines that the portion of source code being compiled using aggressive optimizations has these attributes and the optimization in the listing 412 is being applied as one of the aggressive optimizations, then the compiler 410 may also generate a conservatively compiled version 430 of the same portion of source code. As a result, both an aggressively compiled version 420 and a conservatively compiled version 430 are generated for the same portion of source code and are provided in the compiled code 415. The compiler 410 further generates an entry in the mapping data structure 440 that identifies the correspondence between the aggressively compiled version 420 and the conservatively compiled version 430.

The compiler 410 places these versions 420 and 430 of compiled code into transactions in the compiled computer program 415. In order to place such versions 420 and 430 of compiled code into transactions, the compiler 410 introduces code statements for implementing transactions, i.e. code indicating the start and end of a transaction that is recognizable by a transaction-based data processing device/system 450. The generation of transaction based code is generally known in the art and thus, a more detailed explanation is not provided herein.

The compiler 410 provides a compiled computer program containing the code versions 420 and 430, as well as the mapping data structure 440, to a processor of the same or a different data processing device/system 450. The data processing device/system 450 executes the computer program including the code versions 420 and 430. The execution is monitored by monitoring logic 465 of a transaction monitor 460 of the data processing device/system 450 to determine if the execution of the aggressively compiled code version 420 fails. Should the transaction comprising the aggressively compiled code version 420 fail, the monitoring logic 465 of the transaction monitor 460 aborts the changes made by the transaction and performs a lookup operation in the mapping data structure 440 to determine a corresponding conservatively compiled code version 430. The monitoring logic 465 of the transaction monitor 460 then redirects execution to the conservatively compiled code version 430 corresponding to the aggressively compiled code version 420 whose transaction failed.

The failure of the aggressively compiled code version 420 may be determined based on an exception generated by the aggressively compiled code version 420 when it executes. The transaction monitor 460 may be registered with the data processing device/system as an exception handler or interrupt handler for the aggressively compiled code versions 420. The exceptions may be immediately handled using the mechanism of the illustrative embodiments, in which case the execution of the computer program is immediately interrupted. Alternatively, these exceptions may be deferred, such as described in commonly assigned and co-pending U.S. patent application Ser. No. 12/543,614, which is hereby incorporated by reference, until a time where it is determined whether or not this exception actually affects the overall operation of the computer program.

Optionally, the transaction monitor 460 may further maintain a log data structure 470 corresponding to the computer code that identifies the failures detected by the transaction monitor 460. This log data structure 470 may be used for purposes of debugging the computer code and for predictive purposes in accordance with another illustrative embodiment. That is, the transaction monitor 460 may optionally include prediction logic 467 for predicting whether or not an aggressively compiled code version 420 is likely to fail if executed. Such prediction logic 467 may utilize the history of failures logged in the log data structure 470 to make such a prediction. For example, if the same aggressively compiled code version 420 has failed a predetermined number of times during previous executions, the prediction logic 467 may predict that it is likely to fail again. As a result, the monitoring logic 465 of the transaction monitor 460 may redirect execution to the conservatively compiled code version 430 prior to attempting to execute the aggressively compiled code version 420.

It should be noted that while the predictive operation is described as being based on the log data structure 470, this is not a requirement. Rather, or in addition to the log data structure 470, the prediction logic 467 may perform an analysis of the portion of code, or perform other operations to predict whether the aggressively compiled code version 420 is likely to result in a failure or not. For example, a check may be performed on an address to determine whether the address falls in a predetermined range next to a page boundary. In one embodiment, a prediction may be made that addresses within a range of the page boundary may cause a page reference violation and immediately transfer execution to a conservatively compiled code version, yet use transaction-based recovery for race conditions with a second thread in a multi-threaded application.

Thus, in this way, aggressive optimizations may be made to source code by the compiler 410 with automated mechanisms provided for redirecting execution to more conservatively compiled code versions should the aggressively compiled code versions fail. This provides a performance enhancement over known compiling techniques that avoid such aggressive optimizations at even the remotest possibility that the optimization may result in code that changes the semantics such that a possible exception might be generated. Even in cases where a user overrides such operation by the compiler, the resulting aggressively optimized code may generate exceptions with no option for utilizing conservatively compiled code.

Figure 5:
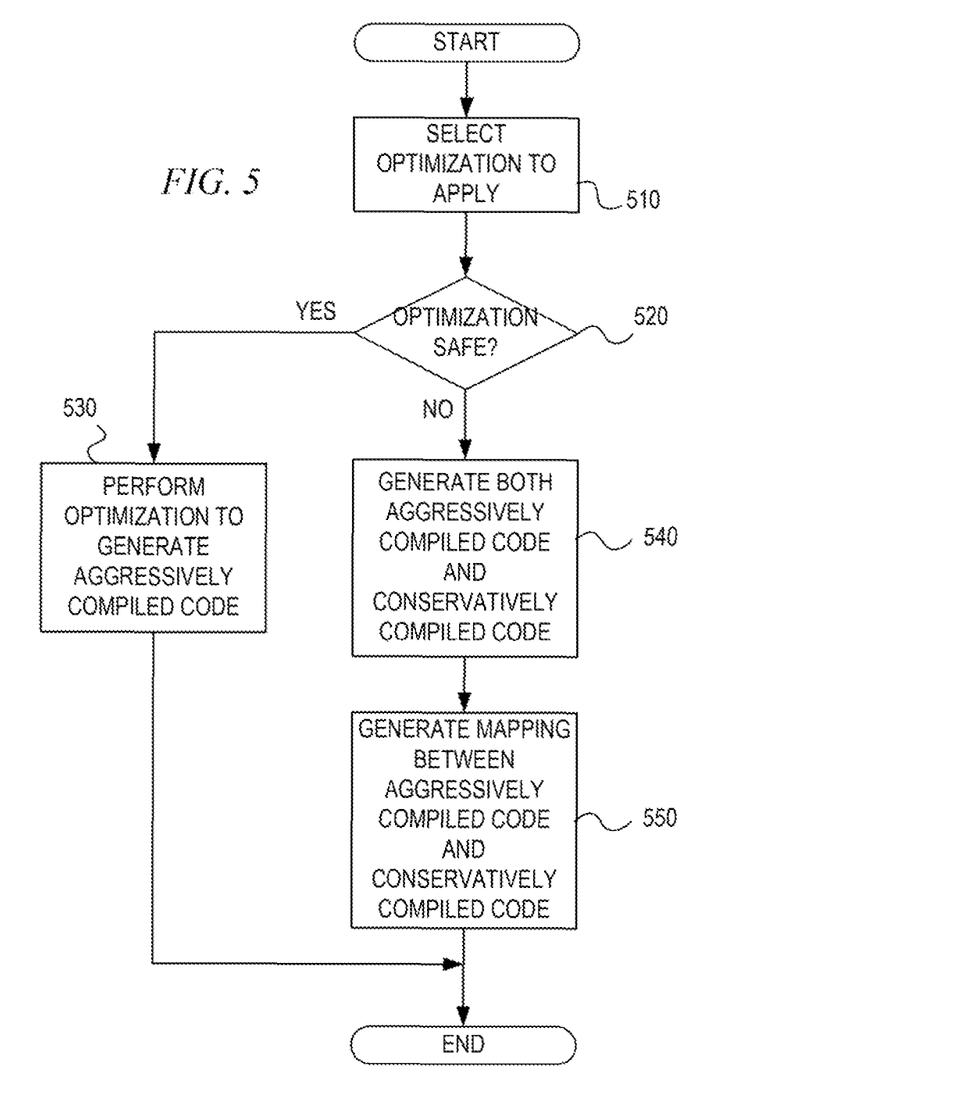
FIG. 5 is a flowchart outlining an operation of a compiler when compiling a portion of source code using aggressive optimization techniques in accordance with the illustrative embodiments.

FIG. 5 is a flowchart outlining an operation of a compiler when compiling a portion of source code using aggressive optimization techniques in accordance with the illustrative embodiments. As shown in FIG. 5, the operation starts with the compiler selecting an optimization to apply to a portion of source code (step 510). The compiler determines whether the selected optimization will result in a change in the original source code semantics such that the original operational intent of the source code is modified or the optimized code is likely to generate an exception that would not have been generated in the original source code (step 520). For example, the compiler may determine whether or not vectorization, parallel if conversion, or other types of optimizations of the original source code will result in optimized code that has a possibility of introducing new exceptions that were not present in the original source code. This is referred to as determining whether the optimization is "safe" or not.

If the optimization is safe, the optimization is performed on the portion of source code to generate aggressively compiled code (step 530). If the optimization is not safe, the compiler generates both an aggressively compiled code version, in which the unsafe optimization is performed, and a conservatively compiled code version, in which the unsafe optimization is not performed (step 540). The compiler then generates a mapping between the aggressively compiled code version and the conservatively compiled code version and stores the mapping in a mapping data structure to be provided with the compiled code to the data processing system that will execute the compiled code (step 550). This mapping may then be used by a transaction monitor of the data processing system in the event that the aggressively compiled code fails or generates an exception. The operation then terminates. While FIG. 5 shows the operation terminating, the operation in fact may be repeated with each portion of source code and with each optimization performed on each portion of source code.

Figure 6:
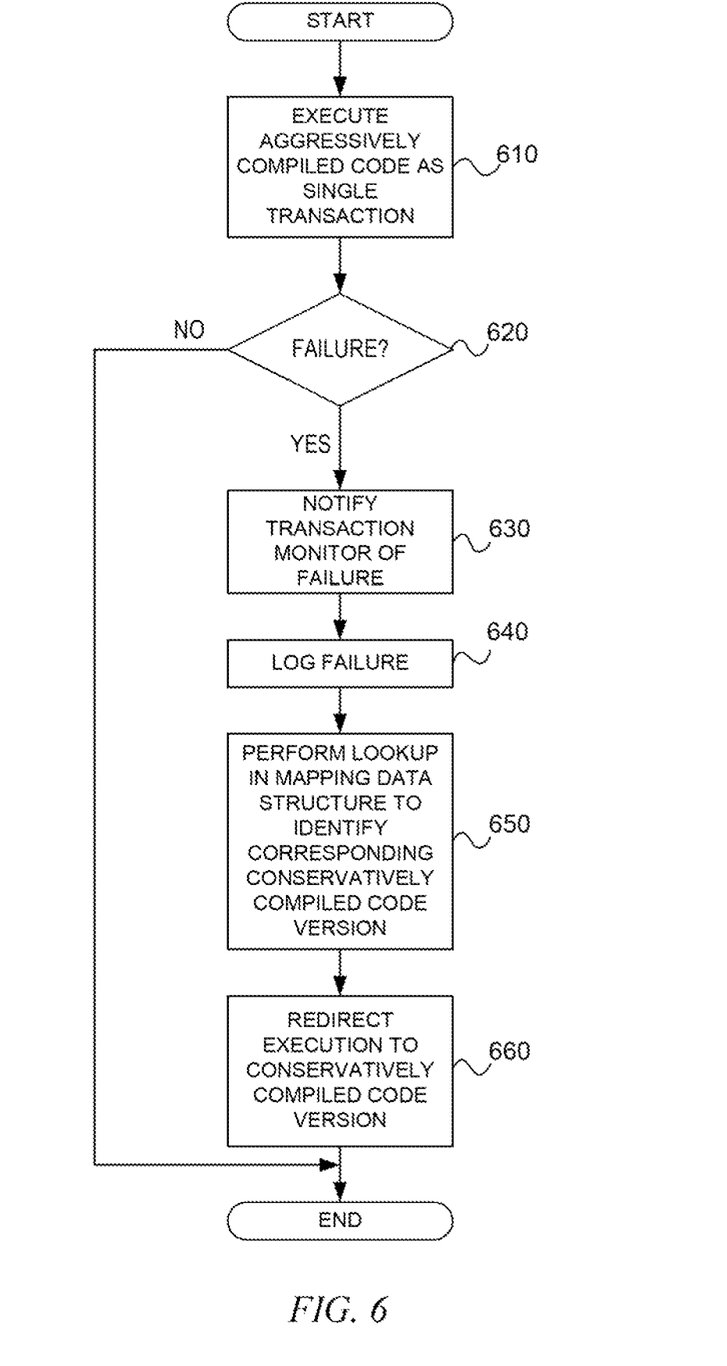
FIG. 6 is a flowchart outlining an example operation of the execution of a computer program in accordance with one illustrative embodiment.

FIG. 6 is a flowchart outlining an example operation of the execution of a computer program in accordance with one illustrative embodiment. As shown in FIG. 6, the operation starts by executing an aggressively compiled code version of a portion of source code as a single transaction (step 610). A determination is made as to whether the aggressively compiled code version transaction fails (step 620). If the transaction does not fail, the operation terminates. If the transaction fails, a transaction monitor is notified of the failure (step 630). The transaction monitor logs the failure (step 640) and performs a lookup operation of the aggressively compiled code version in a mapping data structure to identify a corresponding conservatively compiled code version (step 650). The transaction monitor then redirects execution to the conservatively compiled code version (step 660). The operation then terminates. While FIG. 6 shows a termination, it should be appreciated that this operation may be repeated with each execution of the same or a different aggressively compiled code version.

Figure 7:
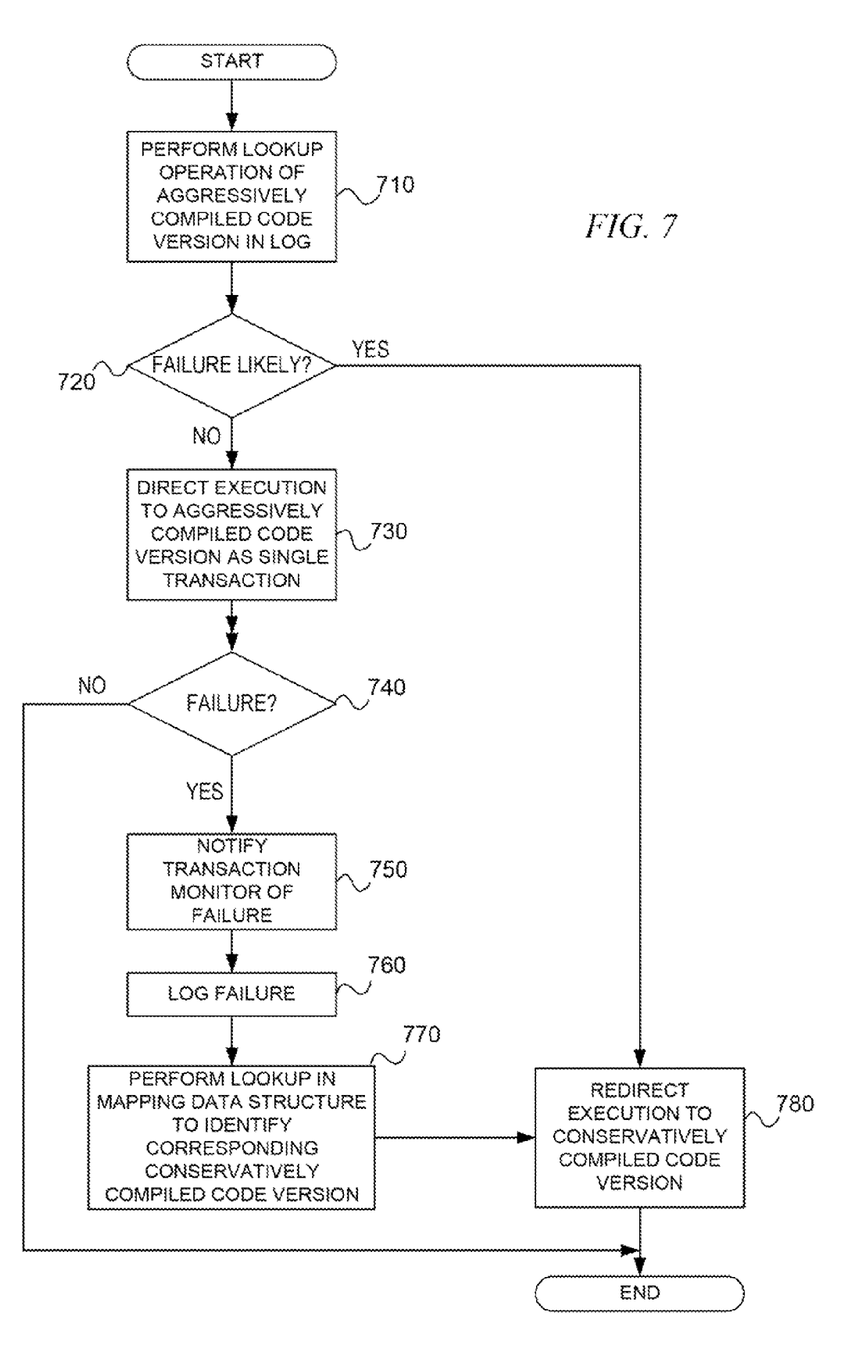
FIG. 7 is a flowchart outlining an example operation of the execution of a computer program in accordance with an illustrative embodiment that utilizes a prediction mechanism for determining whether to execute an aggressively compiled version of a portion of code or not.

FIG. 7 is a flowchart outlining an example operation of the execution of a computer program in accordance with an illustrative embodiment that utilizes a prediction mechanism for determining whether to execute an aggressively compiled version of a portion of code or not. As shown in FIG. 7, the operation starts with a lookup operation of an identifier of an aggressively compiled code version in a log data structure (step 710). A determination is made, based on results of the lookup operation, as to whether the aggressively compiled code version is likely to result in a failure (step 720). If not, then the execution is directed to the aggressively compiled code version of the portion of source code as a single transaction (step 730). A determination is made as to whether the aggressively compiled code version transaction fails (step 740). If the transaction does not fail, the operation terminates. If the transaction fails, a transaction monitor is notified of the failure (step 750). The transaction monitor logs the failure (step 760) and performs a lookup operation of the aggressively compiled code version in a mapping data structure to identify a corresponding conservatively compiled code version (step 770). Thereafter, or if it is determined in step 720 that the aggressively compiled code version is likely to result in a failure, the transaction monitor redirects execution to the conservatively compiled code version (step 780). The operation then terminates. Again, while FIG. 7 shows a termination, it should be appreciated that this operation may be repeated with each execution of the same or a different aggressively compiled code version.

In one illustrative embodiment, the aggressively compiled code version of a portion of source code corresponds to a vectorized version of the portion of source code that is executed in parallel and the conservatively compiled code version is a scalar version, or un-vectorized version, of the portion of source code that is executed in a serial manner. In accordance with this illustrative embodiment, the performance of parallel execution is obtained in the majority of execution cases, but correct execution ordering at the scalar, per-array-element, level is preserved by executing a less aggressively optimized serial version in response to an exception being detected during vector execution.

Figure 8A:
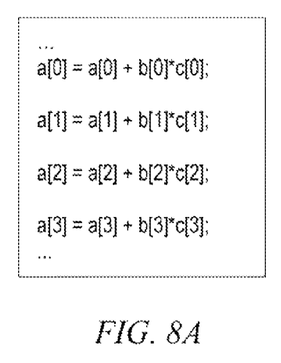
FIG. 8A is an example source program performing scalar operations that may be vectorized by a compiler to generate an optimized program version.
Figure 8B:
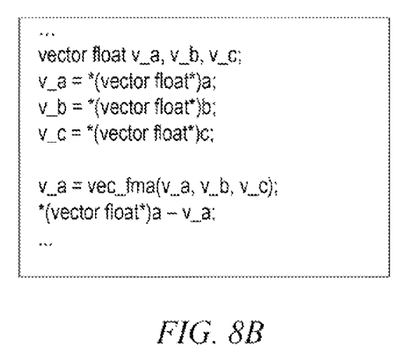
FIG. 8B is a transformed source program showing transformations a compiler may perform to optimize the program by vectorizing the operations of FIG. 8A, but potentially modifying the exception behavior of a program.
Figure 8C:
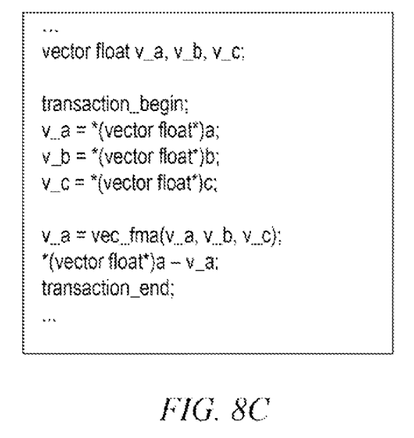
FIG. 8C is a transformed source program showing an aggressively compiled code block in accordance with the transformation of FIG. 8B within a transaction in accordance with one illustrative embodiment.

FIGS. 8A-8C illustrate the various versions of code in accordance with such an embodiment. FIG. 8A illustrates the original source code. FIG. 8B illustrates a vectorized version of the portion of source code shown in FIG. 8A, i.e. an aggressively compiled code version. FIG. 8C illustrates a transaction based version of the aggressively compiled code version shown in FIG. 8B. FIGS. 8B and 8C are represented herein as source code representations for the purpose of exposition of the concepts contained herein. Internal representations are represented by "intrinsics", i.e., pseudo-functions corresponding to machine operations, such as vec_fma for a fused-multiply-add operation on a vector of values. However, those skilled in the art will understand that the compiler may represent the code shown as source code in the exemplary embodiments herein in any other format in accordance with the illustrative embodiments.

The original source code shown in FIG. 8A will cause exceptions for reference exceptions, corresponding to either memory access violations to one of arrays a, b and c, or to floating point exceptions corresponding to the element-based computations for elements 0, 1, 2 or 3 for that specific element. However, the vectorized code of FIG. 8B does not indicate the same exception behavior which can cause some user applications to fail. In accordance with the illustrative embodiments, the vectorized code of FIG. 8B is placed into a transaction as shown in FIG. 8C, and when an exception is raised, the transaction is aborted resulting in a roll-back of all vector computations. A transaction monitor can then transfer control to a serial version of this code, such as the serial version corresponding to FIG. 8A (and optionally not using transactions). The exception will be indicated at the element level for elements 0, 1, 2, or 3 corresponding to the original program's behavior.

Thus, with the mechanisms of the illustrative embodiments, aggressive optimizations, such as vectorization, parallel if conversion, multi-threading, and the like, may be performed even in instances where such optimizations may be determined to be unsafe. Moreover, if it turns out that the optimization is unsafe during execution, the execution can be rolled-back and redirected to a safe version of the code.

As mentioned above, the mechanisms of the illustrative embodiments may be used in cases where boundary condition violations may occur, where thread level race conditions occur, or the like. In the case of thread level race conditions, one thread may write to a same memory location that is accessed by another thread executing in parallel and, as a result, the execution of the second thread may be incorrect. With the mechanisms of the illustrative embodiments, the transaction monitor may determine whether such a race condition occurs or is likely to occur and may abort or rollback one thread in favor of another using the mechanisms described above. That is, the aggressively compiled code version executing on one thread may be aborted or rolled-back such that a conservatively compiled code version is executed that executes in a more serial manner and avoids the race condition.

It should be noted that while the illustrative embodiments are described in terms of use in a transaction based system, the illustrative embodiments are not limited to such. Rather, the mechanisms of the illustrative embodiments may be implemented in any system that utilizes an aggressive speculation and in which a notification is generated when there is a misspeculation such that the changes may be rolled-back or aborted.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for compiling a portion of source code into an executable portion of code, comprising:
    determining, by a compiler excepting on a processor in the data processing system, an optimization to apply to a portion of source code;
    determining, by the compiler, if the optimization as applied to the portion of source code will result in unsafe optimized code and is thus an unsafe optimization, wherein the unsafe optimized code is code that introduces a new source of exceptions being generated by the unsafe optimized code that was not previously present in the portion of source code or generates results which are different from the results that would have been obtained by the portion of source code;
    in response to a determination that the optimization is an unsafe optimization, generating, by the compiler, the executable portion of code with both an aggressively compiled code version of the portion of source code in which the unsafe optimization is applied and a conservatively compiled code version in which the unsafe optimization is not applied; and
    storing, by the compiler, the executable portion of code with both the aggressively compiled code version and conservatively compiled code version in a storage device associated with the data processing system.

2. The method of claim 1, further comprising:
    executing the aggressively compiled code version of the executable portion of code in one of a processor of the data processing system or a processor of another data processing system;
    determining if an exception condition occurs during execution of the aggressively compiled code version;
    rolling-back changes to a state of the executable portion of code in response to a determination that an exception condition occurs; and
    executing the conservatively compiled code version of the executable portion of code in one of the processor of the data processing system or the processor of another data processing system in response to rolling-hack changes to the state of the executable portion of code.

3. The method of claim 1, wherein the aggressively compiled code version is a vectorized version of the portion of code, which is executed in a parallel manner, and wherein the conservatively compiled code version is a scalar code version that is executed in a serial manner.

4. A method, in a data processing system, for executing an executable code, comprising:
    receiving executable code having a portion of code for which an aggressively compiled code version and a conservatively compiled code version of the portion of code are provided;
    executing the aggressively compiled code version of the portion of code in a processor of the data processing system;
    determining if an exception condition occurs during execution of the aggressively compiled code version;
    rolling-back changes to a state of the portion of code in response to a determination that an exception condition occurs; and
    executing the conservatively compiled code version in the processor of the data processing system in response to rolling-hack changes to the state of the portion of code.

5. The method of claim 4, further comprising:
generating a prediction as to whether execution of the aggressively compiled code version of the executable portion of code is likely to result in an exception condition occurring; and
in response to the prediction indicating that an exception condition is likely to occur if the aggressively compiled code version is executed, executing the conservatively compiled code version in the processor of the data processing system.

6. The method of claim 4, wherein the aggressively compiled code version is executed as a single transaction monitored by a transaction monitor of the data processing system.

7. The method of claim 6, wherein:
determining if an exception condition occurs during execution of the aggressively compiled code version comprises determining, by the transaction monitor, if the transaction comprising the aggressively compiled code version aborts or commits successfully,
rolling-back changes to a state of the portion of code in response to a determination that an exception condition occurs comprises rolling-back the transaction comprising the aggressively compiled code version, and
the exception condition causes an abort of the transaction.

8. The method of claim 6, wherein executing the conservatively compiled code version in the processor of the data processing system in response to rolling-back changes to the state of the executable portion of code comprises:
maintaining, in association with the transaction monitor, a data structure for mapping the aggressively compiled code version to the conservatively compiled code version; and
performing a lookup operation, by the transaction monitor, in the data structure based on the aggressively compiled code version, in response to the transaction aborting, to obtain a pointer to a corresponding conservatively compiled code version.

9. The method of claim 6, further comprising:
logging, by the transaction monitor, in a log data structure, transactions corresponding to the aggressively compiled code version that abort;
performing a prediction operation, based on the log data structure, of whether execution of the aggressively compiled code version is likely to result in an abort of a transaction associated with the aggressively compiled code version; and
initiating execution of the conservatively compiled code version rather than the aggressively compiled code version in response to a prediction that execution of the aggressively compiled code version is likely to result in an abort of the associated transaction.

10. A computer program product comprising a non-transitory computer readable storage medium having a computer readable program stored therein, wherein the computer readable program, when executed on in a data processing system, causes the data processing system to:
determine, by a compiler executing in the data processing system, an optimization to apply to a portion of source code;
determine, by the compiler, if the optimization as applied to the portion of source code will result in unsafe optimized code and is thus an unsafe optimization, wherein the unsafe optimized code is code that introduces a new source of exceptions being generated by the unsafe optimized code that was not previously present in the portion of source code or generates results which are different from the results that would have been obtained by the portion of source code;
generate, by the compiler, in response to a determination that the optimization is an unsafe optimization, the executable portion of code with both an aggressively compiled code version of the portion of source code in which the unsafe optimization is applied and a conservatively compiled code version in which the unsafe optimization is not applied; and
store, by the compiler, the executable portion of code with both the aggressively compiled code version and conservatively compiled code version in a storage device associated with the data processing system.

11. The computer program product of claim 10, wherein the computer readable program further causes the computing device to
execute the aggressively compiled code version of the executable portion of code in one of a processor of the computing device or a processor of another data processing system;
determine if an exception condition occurs during execution of the aggressively compiled code version;
rolling-back changes to a state of the executable portion of code in response to a determination that an exception condition occurs; and
execute the conservatively compiled code version of the executable portion of code in one of the processor of the data processing system or the processor of another data processing system in response to rolling-back changes to the state of the executable portion of code.

12. The computer program product of claim 10, wherein the aggressively compiled code version is a vectorized version of the portion of code, which is executed in a parallel manner, and wherein the conservatively compiled code version is a scalar code version that is executed in a serial manner.

13. A computer program product comprising a non-transitory computer readable storage medium having a computer readable program stored therein, wherein the computer readable program, when executed on in a data processing system, causes the data processing system to:
receive executable code having a portion of code for which an aggressively compiled code version and a conservatively compiled code version of the portion of code are provided;
execute the aggressively compiled code version of the portion of code in a processor of the data processing system;
determine if an exception condition occurs during execution of the aggressively compiled code version;
roll-back changes to a state of the portion of code in response to a determination that an exception condition occurs; and
execute the conservatively compiled code version in the processor of the data processing system in response to rolling-back changes to the state of the portion of code.

14. The computer program product of claim 13, wherein the computer readable program further causes the data processing system to:
generate a prediction as to whether execution of the aggressively compiled code version of the executable portion of code is likely to result in an exception condition occurring; and
execute, in response to the prediction indicating that an exception condition is likely to occur if the aggressively compiled code version is executed, the conservatively compiled code version.

15. The computer program product of claim 13, wherein the aggressively compiled code version is executed as a single transaction monitored by a transaction monitor of the data processing system.

16. The computer program product of claim 15, wherein:
   determining if an exception condition occurs during execution of the aggressively compiled code version comprises determining, by the transaction monitor, if the transaction comprising the aggressively compiled code version aborts or commits successfully,
   rolling-back changes to a state of the portion of code in response to a determination that an exception condition occurs comprises rolling-back the transaction comprising the aggressively compiled code version, and
   the exception condition causes an abort of the transaction.

17. The computer program product of claim 15, wherein the computer readable program causes the data processing system to execute the conservatively compiled code version in the processor of the data processing system in response to rolling-back changes to the state of the executable portion of code by:
   maintaining, in association with the transaction monitor, a data structure for mapping the aggressively compiled code version to the conservatively compiled code version; and
   performing a lookup operation, by the transaction monitor, in the data structure based on the aggressively compiled code version, in response to the transaction aborting, to obtain a pointer to a corresponding conservatively compiled code version.

18. The computer program product of claim 15, wherein the computer readable program further causes the data processing system to:
   log, by the transaction monitor, in a log data structure, transactions corresponding to the aggressively compiled code version that abort;
   perform a prediction operation, based on the log data structure, of whether execution of the aggressively compiled code version is likely to result in an abort of a transaction associated with the aggressively compiled code version; and
   initiate execution of the conservatively compiled code version rather than the aggressively compiled code version in response to a prediction that execution of the aggressively compiled code version is likely to result in an abort of the associated transaction.

19. An apparatus for performing a predicated atomic commit of stores to a memory, comprising:
   a processor; and
   a memory coupled to the processor, wherein the processor is configured to:
   receive, in the memory, executable code having a portion of code for which an aggressively compiled code version and a conservatively compiled code version of the portion of code are provided;
   execute the aggressively compiled code version of the portion of code;
   determine if an exception condition occurs during execution of the aggressively compiled code version;
   roll-back changes to a slate of the portion of code in response to a determination that an exception condition occurs; and
   execute the conservatively compiled code version in response to rolling-hack changes to the state of the portion of code.

20. The apparatus of claim 19, wherein the processor is further configured to:
   generate a prediction as to whether execution of the aggressively compiled code version of the executable portion of code is likely to result in an exception condition occurring; and
   execute, in response to the prediction indicating that an exception condition is likely to occur if the aggressively compiled code version is executed, the conservatively compiled code version.

21. The apparatus of claim 19, wherein the aggressively compiled code version is executed as a single transaction monitored by a transaction monitor.

22. The apparatus of claim 21, wherein:
   the processor determines if an exception condition occurs during execution of the aggressively compiled code version by determining, by the transaction monitor, if the transaction comprising the aggressively compiled code version aborts or commits successfully,
   the processor rolls-back changes to a state of the portion of code in response to a determination that an exception condition occurs by rolling-back the transaction comprising the aggressively compiled code version, and
   the exception condition causes an abort of the transaction.

23. The apparatus of claim 21, wherein the processor executes the conservatively compiled code version in the processor of the data processing system in response to rolling-back changes to the state of the executable portion of code by:
   maintaining, in association with the transaction monitor, a data structure for mapping the aggressively compiled code version to the conservatively compiled code version; and
   performing a lookup operation, by the transaction monitor, in the data structure based, on the aggressively compiled code version, in response to the transaction aborting, to obtain a pointer to a corresponding conservatively compiled code version.

24. The apparatus of claim 21, wherein the processor is further configured to:
   log, by the transaction monitor, in a log data structure, transactions corresponding to the aggressively compiled code version that abort;
   perform a prediction operation, based on the log data structure, of whether execution of the aggressively compiled code version is likely to result in an abort of a transaction associated with the aggressively compiled code version; and
   initiate execution of the conservatively compiled code version rather than the aggressively compiled code version in response to a prediction that execution of the aggressively compiled code version is likely to result in an abort of the associated transaction.

25. The apparatus of claim 19, wherein the aggressively compiled code version is a vectorized version of the portion of code, which is executed in a parallel manner, and wherein the conservatively compiled code version is a scalar code version that is executed in a serial manner.

* * * * *